United States Patent [19]

Quilliam

[11] 4,116,320
[45] Sep. 26, 1978

[54] CLUTCH

[75] Inventor: Douglas John Quilliam, Pensilva Liskeard, England

[73] Assignee: Fairey Winches Limited, Heston, England

[21] Appl. No.: 767,834

[22] Filed: Feb. 11, 1977

[30] Foreign Application Priority Data

Mar. 30, 1976 [GB] United Kingdom ............... 12785/76
Nov. 24, 1976 [GB] United Kingdom ............... 49040/76

[51] Int. Cl.$^2$ ......................... F16D 1/06; F16D 23/14
[52] U.S. Cl. ................................ 192/89 A; 192/93 A
[58] Field of Search ................ 192/89 A, 67 R, 93 R, 192/93 A, 95, 109 R, 109 A

[56] References Cited

U.S. PATENT DOCUMENTS

| 3,124,377 | 3/1969 | O'Brien et al. ................ 192/89 A X |
| 3,442,361 | 5/1969 | Hegar .......................... 192/109 A X |
| 3,669,476 | 6/1972 | Wilson ........................ 192/109 A UX |

Primary Examiner—Roy Lake
Assistant Examiner—E. F. Desmond
Attorney, Agent, or Firm—Marn & Jangarathis

[57] ABSTRACT

In the hub clutch disclosed, an external annular body coaxially encircles a drive member and is radially spaced from it. An annular clutch member, coaxial with the drive member and the body, is rigid in rotation with the body but is axially movable for selective engagement and disengagement with the drive member as regards rotation. An axially movable actuator for the clutch member is connected to and spaced coaxially from the clutch member by spring connecting means. An axially fixed cover has a rim coaxially encircling the body and has an end wall axially spaced from the body and the drive member, the cover being rotatable relative to the body. The end wall and the actuator have axially extending cam formations which cooperate to cause axial motion of the actuator upon rotation of the cover relative to the body, the actuator being urged towards the end wall by spring biasing means.

12 Claims, 7 Drawing Figures

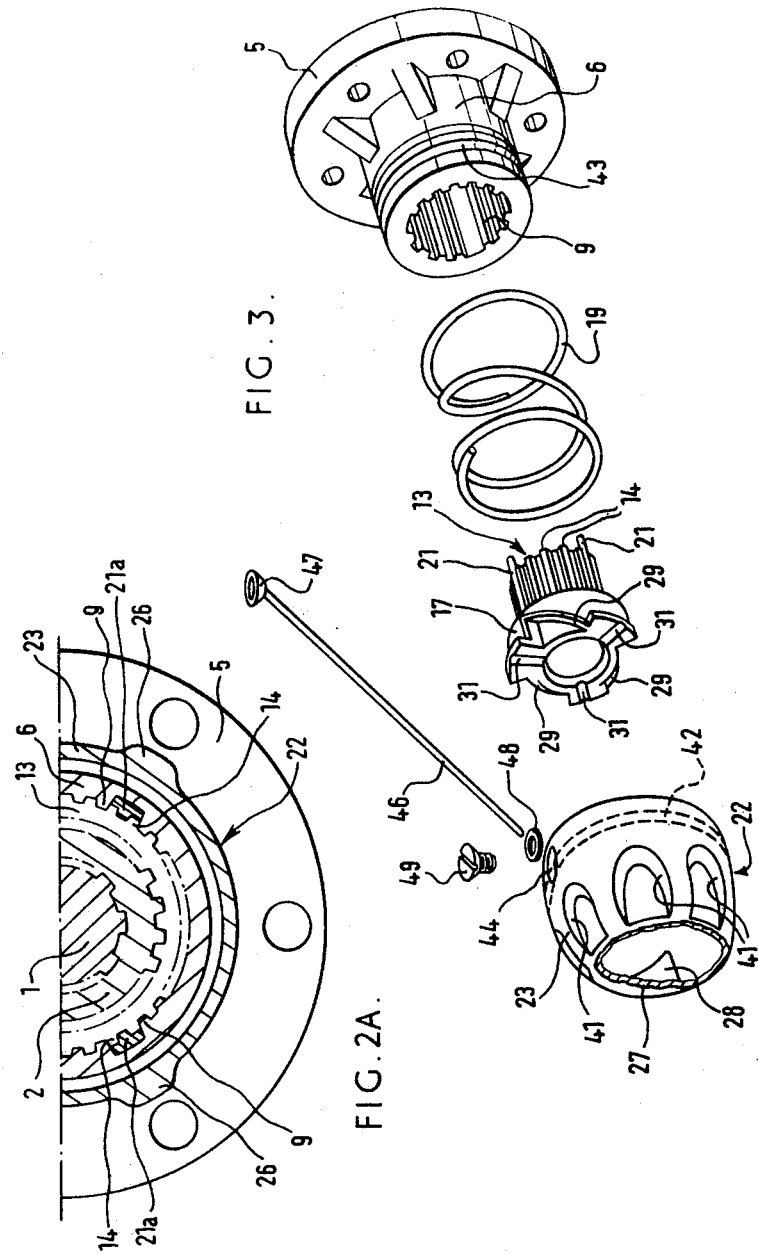

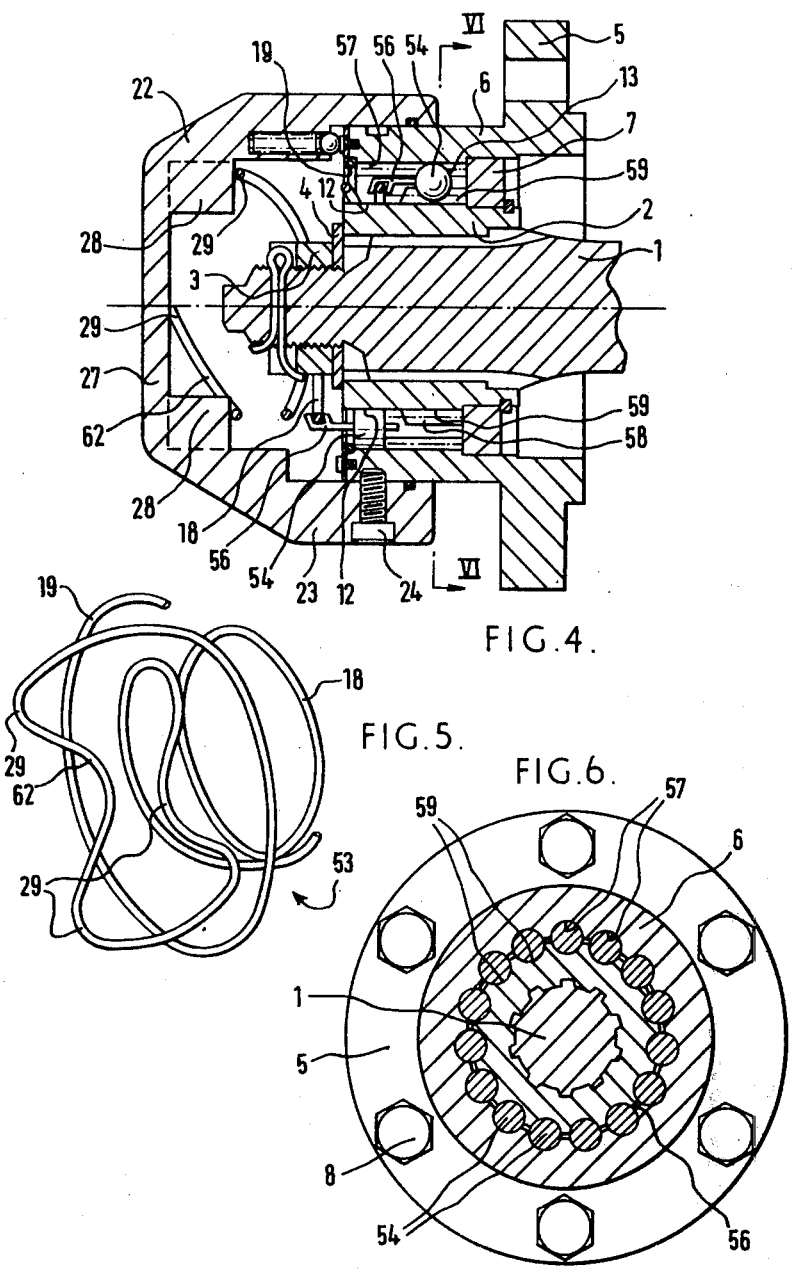

CLUTCH

This invention relates to a hub clutch for the wheel of a vehicle, the clutch comprising an inner drive member; an external annular body encircling the drive member and being radially spaced therefrom; a bearing which maintains the body coaxial with the drive member; an annular clutch member coaxial with the drive member and the body, the clutch member being rigid in rotation with the body but being axially movable for selective engagement and disengagement with the drive member as regards rotation; an axially movable actuator connected to and spaced axially from the clutch member by spring connecting means; and an axially fixed cover mounted on the body, the cover and the actuator having means for causing axial motion of the actuator. In the following text this hub clutch will be referred to as "a hub clutch of the type referred to."

On four-wheel-drive vehicles with a two-wheel-drive option, the two or four wheel drive selection is made by means of a lever in the cab. If two-wheel drive is selected this means that, when the vehicle is moving, the (non-driven) front wheels are turning the front half-shafts, the front differential, the front propeller shaft, and some of the gears in the transfer box. This imposes a drag load on the transmission and hence increases fuel consumption. For this reason it is beneficial to fit a hub clutch of the type referred to on each of the front wheels in order to allow disengagement of the front wheels from the front half-shafts when the vehicle is used in the two-wheel-drive mode.

Hub clutches of the type referred to which are already in use have certain disadvantages. They are complex and bulky and are difficult to install, requiring special tools for this purpose. Furthermore, access to the interior of the hub clutch for servicing and adjustment is difficult.

The present invention provides a hub clutch of the type referred to, in which the ends of the body and drive member adjacent the cover are at substantially the same axial position, the cover has a rim coaxially encircling the body and has an end wall axially spaced from the body and drive member, the cover is rotatable relative to the body, spring biasing means are provided for urging the actuator towards the end wall, and the end wall and the actuator have axially extending cam formations which cooperate to cause axial motion of the actuator upon rotation of the cover relative to the body.

The fact that the ends of the body and drive member are at substantially the same axial position facilitates the fitting of the unit consisting of the body, the drive member, and the bearing onto the half-shaft of the vehicle wheel, since the body does not obstruct access to the end of the half-shaft (e.g. for tightening of a retaining nut).

The cover is of simple construction. The cooperating cam formations of the cover end-wall and the actuator provide a simple and reliable means for causing axial motion of the actuator by turning the cover through less than 360°. Preferably there are three cam formations in the cover cooperating with three corresponding cam formations on the actuator. It is preferably for the peak of the or each cam formation on one of the two components to have a recess which receives the peak of the corresponding cooperating cam formation on the other component, in order to positively locate the position in which the clutch member is engaged with the drive member.

As the actuator is moved towards the clutch member upon rotation of the cover in order to engage the clutch member with the drive member, the spring connecting means is compressed; if the members are in interfering relationship, the clutch member remains disengaged until there is relative rotation of the drive member and the body, whereupon the compression of the spring connecting means causes engagement of the clutch member with the drive member. When the cover is turned in order to disengage the clutch, the spring connecting means is put under tension owing to the action of the spring biasing means; this tension disengages the clutch member from the drive member.

Preferably the actuator carries axially extending pins which extend between the body and the clutch member to prevent rotation of the actuator relative to the body. Each pin may be a sliding fit in a groove in either the body or the clutch member.

The spring biasing means is preferably a coil spring coaxial with the cover. Similarly the spring connecting means is preferably a coil spring coaxial with the cover. The two coil springs may conveniently be integral parts of a single coiled spring. Furthermore, it is possible for the actuator to be an integral part of this coiled spring, the actuator being constituted by a portion of the spring forming a transition between the coaxial coil springs, this transitional portion being shaped to provide a cam formation or formations cooperating with the cam formation or formations of the cover.

It is preferable for the clutch member to engage with the drive member by means of cooperating splines, since this provides a simple and cheap construction. However, in humid climates there is a risk of the splines becoming rusted, which may prevent engagement or disengagement. A clutch member which is less liable to seizure due to rust comprises a plurality of rolling elements rotatably mounted on a carrier coaxial with the drive member, the rolling elements being engageable in axially extending external grooves formed in an enlarged portion of the drive member. Preferably, the rolling elements engage permanently in axially extending grooves in the body.

The cover is preferably retained on the body by a flexible elongate member occupying a circumferentially extending groove in the rim of the cover and a circumferentially extending groove in the body, an end of the elongate member being accessible through an opening in the rim, through which opening the elongate member can be inserted and removed.

The invention will be described further, by way of example only, with reference to the accompanying drawings, in which:

FIG. 2A is a modified version of the lower half of FIG. 2;

FIG. 3 is an exploded perspective view of a modified hub clutch, the drive member being omitted for clarity;

FIG. 4 is an axial section through another embodiment of a hub clutch, the upper part of the Figure showing the clutch engaged, the lower part disengaged;

FIG. 5 is a perspective view of a coiled spring used in the clutch of FIG. 4; and FIG. 6 is a section on line VI—VI of FIG. 4, with the clutch engaged.

In the drawings, similar parts are indicated by the same reference numerals.

Figure 1:
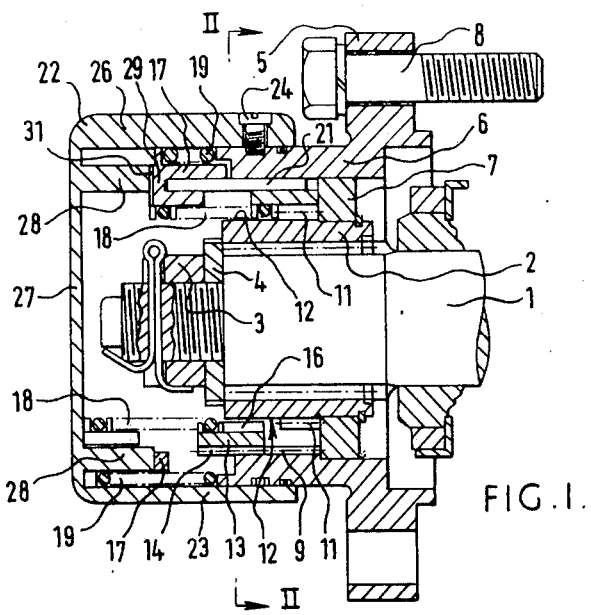
FIG. 1 is an axial section through a hub clutch on the half-shaft of a vehicle wheel, being a section on line I—I of FIG. 2, the upper part of the Figure showing the clutch engaged, the lower part disengaged.
Figure 2:
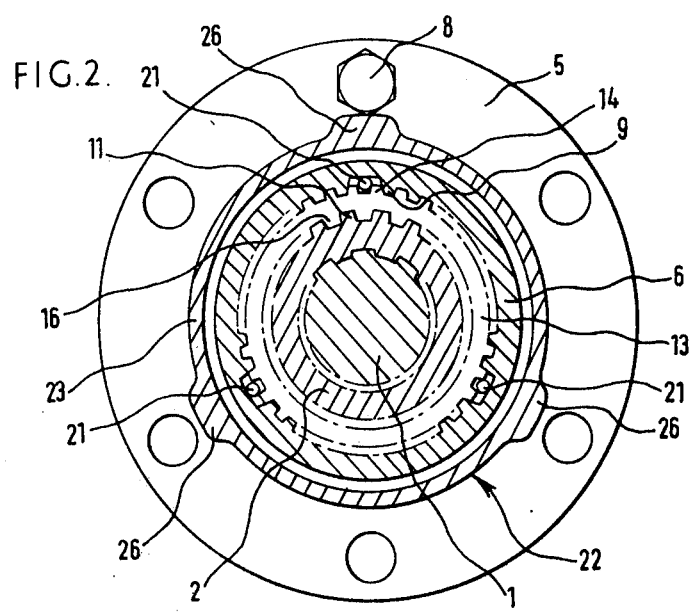
FIG. 2 is a section on line II—II of FIG. 1, the clutch being engaged.

The hub clutch illustrated in FIGS. 1 and 2 is installed to act between the half-shaft 1 of a front wheel of a four-wheel-drive vehicle and the wheel hub (not shown). A drive member 2 is fitted on the splined outer end of the half-shaft 1 and is retained there by a nut 3 and a washer 4. An external annular body 6 encircles the drive member 2 and is maintained coaxial with it by a solid bearing ring 7 on which the body 6 is rotatable. The body 6 is fixed to the wheel hub (not shown) by six bolts 8 passing through a flange 5 integral with the body 6.

The body 6 has internal splines 9 extending from the bearing ring 7 to its outer end, which is at the same axial position as the outer end of the drive member 2. The drive member 2 has external splines 11 extending along only part of its axial length from the bearing ring 7, the remainder of the peripheral surface being a plain cylindrical surface 12. The splines 9 and 11 are spaced apart in the radial direction.

Between the body 6 and the drive member 2, and coaxial with them, there is an annular clutch member 13 with external splines 14 which are always in mesh with the internal splines 9 of the body 6. The clutch member 13 also has internal splines 16 and is axially movable so that the splines 16 are either adjacent the plain cylindrical surface 12 of the drive member 2 (lower part of FIG. 1) or in mesh with the splines 11 (upper part of FIG. 1).

An axially movable substantially annular actuator 17 is connected to and spaced from the clutch member 13 by a connecting coil spring 18. The actuator 17 is constantly urged away from the body 6 by a biasing coil spring 19 which is always under compression. The actuator 17 is moulded in plastics material and carries three equi-spaced roll pins or spring pins 21, which are a force-fit in the actuator and are a sliding fit between adjacent splines 14 (FIG. 2) of the clutch member 13. At the position of each pin 21, the body 6 therefore lacks a spline 9.

Alternatively, as shown in FIG. 2A, the roll pins 21 can be replaced by plastics pins 21a which are moulded integrally with the actuator and are substantially T-shaped in cross-section so as to be a sliding fit in the correspondingly shaped space between the splines 9 and 14.

The hub clutch has a manually rotatable cover 22 having a rim 23 which coaxially encircles the body 6. Three locating screws 24 are screwed into thickened parts 26 of the rim 23 and run in a circumferential groove in the body 6 in order to prevent axial movement of the cover 22. The end-wall 27 of the cover 22 is integral with three equi-spaced axially extending cam formations 28 which cooperate with three respective equi-spaced axially-extending cam formations 29 on the actuator 17 (best seen in FIG. 3). The cooperating surface of the formations 28 and 29 are shaped as inclined ramps which ride up one another as the cover 22 is rotated through just less than 120° to engage the clutch. The peak of each formation 29 has a locating recess 31 shaped to receive the peak of the corresponding formation 28.

When the hub clutch is disengaged, the actuator 17 and the clutch member 13 are in the positions shown in the lower part of FIG. 1. The biasing spring 19 is at its maximum length but is still under compression; the connecting spring 18 is at its natural unstressed length. In order to engage the hub clutch, the cover 22 is turned clockwise through nearly 120° until the peaks of the formations 28 locate themselves in the recesses 31 after pushing the actuator 17 towards the body 6 against the action of the biasing spring 19. The axial force on the actuator 17 is transmitted to the clutch member 13 by the connecting spring 18. If the splines 16 are not in interfering relationship with the splines 11, the clutch member 13 slides into engagement with the drive member 2. If the splines 11 and 16 interfere with one another, the connecting spring 18 becomes compressed, and this compression will automatically engage the clutch as soon as the body 6 and drive member 2 rotate relative to each other.

In order to disengage the hub clutch, the cover 22 is turned anti-clockwise. The biasing spring 19 urges the actuator 17 back towards the end-wall 27 of the cover 22 and puts the connecting spring 18 under tension. If this tension is sufficient to overcome friction between the clutch member 13 and the body 6 and drive member 2, the clutch becomes disengaged. If the tension is insufficient, the clutch will disengage as soon as the body 6 and the drive member 2 move relative to one another, thus causing a reduction in friction.

The modified hub clutch shown in FIG. 3 is the same as that shown in FIGS. 1 and 2 except for certain features of the cover 22 and its connection to the body 6. The cover 22 is more rounded in shape and its rim 23 has equi-spaced depressions 41 facilitating manual operation of the hub-clutch. The rim 23 has a circumferentially extending groove 42 which registers with a circumferentially extending groove 43 in the body 6. A screw-threaded countersunk opening 44 in the rim 23 gives access to the groove 42. A flexible elongate member in the form of a plastics retaining strip 46 is inserted through the opening 44 and occupies the grooves 42 and 43, thereby preventing relative axial movement of the cover 22 and the body 6 while permitting rotation of the cover 22. One end of the strip 46 has an integral ring 47 which fits on a sealing washer 48 in the opening 44 and is retained there by a screw 49.

In the hub clutch illustrated in FIGS. 4 to 6, the connecting spring 18 and the biasing spring 19 are integral parts of a coiled spring 53 (FIG. 5). The moulded plastics actuator 17 of FIG. 1 has been replaced by an actuator constituted by the extended transitional portion 62 of the spring 53, which portion 62 connects the spring 18 to the spring 19. This actuator or transitional portion 62 is shaped to provide three lobes or cam formations 29 which cooperate with the cam formations 28 on the end wall 27, allowing engagement and disengagement of the clutch in the manner already described.

The clutch member 13 comprises rolling elements 54 mounted in a cage 56. The rolling elements 54 are either balls (as shown in the upper part of FIG. 4) or rollers (lower part of FIG. 4). The rolling element 54 engage in axially extending grooves 57 in the body 6 so that the cage 56 is at all times prevented from rotating relative to the body 6. When the clutch is disengaged (lower part of FIG. 4) the rolling elements 54 are in contact with the plain cylindrical surface 12 of the drive member 2 and are thus caused to rotate when the body 6 turns relative to the drive member 2; this reduces the risk of the clutch member 13 seizing up because of rust.

The drive member 2 has an enlarged portion 58 with axially extending grooves 59 for receiving the rolling elements 54. When the grooves 57 and 59 are out of register and the clutch is actuated by turning the cover 22, the connecting spring 18 is compressed, since the rolling elements 54 are unable to enter the grooves 59. When the body 6 and the drive member 2 subsequently rotate relative to each other, the compression of the spring 18 will engage the clutch by pushing the clutch member 13 onto the enlarged portion 58 of the drive member 2 as soon as the grooves 57 and 59 are in register with one another (upper part of FIG. 4 and FIG. 6).

I claim:

1. In a hub clutch for the wheel of a vehicle, the clutch comprising an inner drive member, an external annular body encircling the drive member and being radially spaced therefrom; a bearing which maintains the body coaxial with the drive member; an annular clutch member coaxial with the drive member and the body, the clutch member being rigid in rotation with the body but being axially movable for selective engagement and disengagement with the drive member as regards rotation; an axially movable actuator connected to and spaced axially from the clutch member by spring connecting means; means for preventing rotation of the actuator relative to the body; and an axially fixed cover mounted on the body: the improvement that the ends of the body and drive member adjacent the cover are at substantially the same axial position, the cover has a rim coaxially encircling the body and has an end wall axially spaced from the body and drive member, the cover is rotatable relative to the body, spring biasing means are provided for urging the actuator towards the end wall, the end wall and the actuator have axially extending cam formations which cooperate to cause axial motion of the actuator upon rotation of the cover relative to the body, and the means for preventing rotation of the actuator comprise axially extending pins carried by the actuator and engaging permanently in axial slots in the body.

2. The hub clutch of claim 1, wherein the cam formations on the end wall comprise ramps which are all inclined in the same direction and cooperate with an equal number of corresponding cam formations on the actuator.

3. The hub clutch of claim 1, wherein the peak of the or each formation on one of the two components has a recess for receiving the peak of the corresponding cooperating cam formation on the other component.

4. The hub clutch of claim 1, wherein the axially extending pins extend between the body and the clutch member to prevent rotation of the actuator relative to the body.

5. The hub clutch of claim 1, wherein the spring biasing means comprises a coil spring coaxial with the cover.

6. The hub clutch of claim 1, wherein the spring connecting means comprises a coil spring coaxial with the cover.

7. In a hub clutch for the wheel of a vehicle, the clutch comprising an inner drive member; an external annular body encircling the drive member and being radially spaced therefrom; a bearing which maintains the body coaxial with the drive member; an annular clutch member coaxial with the drive member and the body, the clutch member being rigid in rotation with the body but being axially movable for selective engagement and disengagement with the drive member as regards rotation; an axially movable actuator connected to and spaced axially from the clutch member by spring connecting means; means for preventing rotation of the actuator relative to the body; and an axially fixed cover mounted on the body; the improvement that the ends of the body and drive member adjacent the cover are at substantially the same axial position, the cover has a rim coaxially encircling the body and has an end wall axially spaced from the body and drive member, the cover is rotatable relative to the body, spring biasing means are provided for urging the actuator towards the end wall, the end wall and the actuator have axially extending cam formations which cooperate to cause axial motion of the actuator upon rotation of the cover relative to the body, and the spring biasing means and the spring connecting means comprise respective coil springs which are coaxial with the cover and are integral parts of a single coiled spring.

8. The hub clutch of claim 7, wherein the actuator is constituted by a portion of the coiled spring forming a transition between the coaxial coil springs, the transitional portion being shaped to provide at least one cam formation cooperating with the at least one cam formation of the cover.

9. The hub clutch of claim 1, wherein the clutch member engages with the drive member by means of cooperating splines.

10. In a hub clutch for the wheel of a vehicle, the clutch comprising an inner drive member; an external annular body encircling the drive member and being radially spaced therefrom; a bearing which maintains the body coaxial with the drive member; an annular clutch member coaxial with the drive member and the body, the clutch member being rigid in rotation with the body but being axially movable for selective engagement and disengagement with the drive member as regards rotation; an axially movable actuator connected to and spaced axially from the clutch member by spring connecting means; means for preventing rotation of the actuator relative to the body; and an axially fixed cover mounted on the body: the improvement that the ends of the body and drive member adjacent the cover are at substantially the same axial position, the cover has a rim coaxially encircling the body and has an end wall axially spaced from the body and drive member, the cover is rotatable relative to the body, spring biasing means are provided for urging the actuator towards the end wall, the end wall and the actuator have axially extending cam formations which cooperate to cause axial motion of the actuator upon rotation of the cover relative to the body, and the clutch member comprises a carrier coaxial with the drive member and a plurality of rolling elements rotatably mounted on the carrier, the rolling elements being engageable in axially extending grooves formed in an enlarged portion of the drive member.

11. The hub clutch of claim 10, wherein the rolling elements engage permanently in axially extending grooves in the body.

12. In a hub clutch for the wheel of a vehicle, the clutch comprising an inner drive member; an external annular body encircling the drive member and being radially spaced therefrom; a bearing which maintains the body coaxial with the drive member; an annular clutch member coaxial with the drive member and the body, the clutch member being rigid in rotation with the body but being axially movable for selective engagement and disengagement with the drive member as regards rotation; an axially movable actuator connected to and spaced axially from the clutch member by spring connecting means; means for preventing rotation of the actuator relative to the body, and an axially fixed cover mounted on the body: the improvement that the ends of the body and drive member adjacent the cover are at substantially the same axial position, the cover has a rim coaxially encircling the body and has an end wall axially spaced from the body and drive member, the cover is rotatable relative to the body, spring biasing means are provided for urging the actuator towards the end wall, the end wall and the actuator have axially extending cam formations which cooperate to cause axial motion of the actuator upon rotation of the cover relative to the body, and the cover is retained on the body by a flexible elongated member occupying a circumferentially extending groove in the rim of the cover and a circumferentially extending groove in the body, an end of the elongate member being accessible through an opening in the rim through which opening the elongate member can be inserted and removed.

* * * * *